United States Patent
Barrow

(10) Patent No.: US 7,130,922 B1
(45) Date of Patent: Oct. 31, 2006

(54) INTEGRATED SERVICES HUB REBOOT PROCESS

(75) Inventor: Matthew K. Barrow, Overland Park, KS (US)

(73) Assignee: Sprint Communications Comapny L.P., Overland Park, KS (US)

( * ) Notice: Subject to any disclaimer, the term of this patent is extended or adjusted under 35 U.S.C. 154(b) by 710 days.

(21) Appl. No.: 09/998,419

(22) Filed: Nov. 29, 2001

Related U.S. Application Data

(63) Continuation-in-part of application No. 09/747,907, filed on Dec. 22, 2000, now Pat. No. 6,865,192.

(51) Int. Cl.
G06F 15/177 (2006.01)
G06F 15/173 (2006.01)

(52) U.S. Cl. .................... 709/245; 709/223; 709/224; 709/310; 370/475; 370/351; 713/200; 713/201

(58) Field of Classification Search ................ 709/245, 709/230, 228, 220–225, 310; 370/352, 252, 370/402, 431, 368, 475, 351; 379/93.05; 707/200; 713/200, 201
See application file for complete search history.

(56) References Cited

U.S. PATENT DOCUMENTS

| 5,881,142 | A |   | 3/1999  | Frankel et al. ............. 379/167 |
|-----------|---|---|---------|-------------------------------------|
| 5,963,620 | A |   | 10/1999 | Frankel et al. .......... 379/93.05  |
| 6,049,826 | A | * | 4/2000  | Beser ...................... 709/222 |
| 6,075,784 | A |   | 6/2000  | Frankel et al. ............. 370/356 |
| 6,091,737 | A | * | 7/2000  | Hong et al. ................. 370/431 |
| 6,122,639 | A | * | 9/2000  | Babu et al. ............. 707/103 R  |
| 6,141,339 | A |   | 10/2000 | Kaplan et al. .............. 370/352 |
| 6,286,038 | B1| * | 9/2001  | Reichmeyer et al. ....... 709/220    |
| 6,570,855 | B1| * | 5/2003  | Kung et al. ................. 370/237 |
| 6,587,874 | B1| * | 7/2003  | Golla et al. ................ 709/220 |
| 6,598,057 | B1| * | 7/2003  | Synnestvedt et al. ....... 707/200   |
| 6,611,868 | B1| * | 8/2003  | Arutyunov .................. 709/227  |
| 6,631,477 | B1| * | 10/2003 | LeCrone et al. .............. 714/5   |
| 6,643,695 | B1| * | 11/2003 | Takagi et al. ............... 709/224 |
| 6,657,991 | B1| * | 12/2003 | Akgun et al. ................ 370/352 |
| 6,856,602 | B1| * | 2/2005  | Westberg .................... 370/254 |

OTHER PUBLICATIONS

U.S. Appl. No. 09/197,044, filed Nov. 20, 1998, Way et al.
U.S. Appl. No. 09/226,575, filed Jan. 7, 1999, Rush et al.
U.S. Appl. No. 09/660,985, filed Aug. 30, 2000, Kaplan et al.
U.S. Appl. No. 09/650,560, filed Aug. 30, 2000, Kaplan et al.
U.S. Appl. No. 09/653,105, filed Aug. 31, 2000, Dale et al.
U.S. Appl. No. 09/675,585, filed Sep. 29, 2000, Goodrich.
U.S. Appl. No. 09/687,683, filed Oct. 12, 2000, Bayert et al.
U.S. Appl. No. 09/689,365, filed Oct. 12, 2000, Goodrich.
U.S. Appl. No. 09/702,933, filed Oct. 31, 2000, Mahaney.
U.S. Appl. No. 09/711,113, filed Nov. 9, 2000, Goodrich et al.
U.S. Appl. No. 09/727,201, filed Nov. 30, 2000, Mahaney et al.

(Continued)

*Primary Examiner*—David Wiley
*Assistant Examiner*—Jude J. Jean-Gilles

(57) ABSTRACT

The present invention discloses a method of automatically downloading configuration files and binary code for a customer premises telecommunications hub. Upon initial power up, the hub sends a DHCP request to a DHCP server. The DHCP server sends the hub an IP address for the hub, the name of an appropriate configuration file, and identifies file servers where files may be obtained. The hub requests the configuration file from a TFTP file server, and obtains a binary file name. The hub renames the file to include its model ID. The hub then requests the renamed binary file from a TFTP file server. The binary code is downloaded and written into flash memory. The file is rechecked for the correct model ID. The hub then resets so that the new binary code is transferred into the operating RAM.

16 Claims, 2 Drawing Sheets

OTHER PUBLICATIONS

U.S. Appl. No. 09/745,919, filed Dec. 21, 2000, Bayerl et al.
U.S. Appl. No. 09/745,000, filed Dec. 21, 2000, Bayerl et al.
U.S. Appl. No. 09/747,907, filed Dec. 22, 2000, Barrow.
U.S. Appl. No. 09/751,778, filed Dec. 29, 2000, Lawitzke.
Cricket Liu & Matt Larson, *IP Address Management: Past, Present and Future*, 2000, pp. 1-8, www.metainfo.com/products/understand.cfm.
Author unknown, *Meta IP/DHCP Overview*, 1998, pp. 1-2, www.metainfo.com/tech/MetaIP/MetaIP40/helpfiles/DHCPOverview.html.
Author unknown, *DHCP Options dialog box*, 1998, pp. 1-11, www.metainfo.com/tech/MetaIP/MetaIP40/helpfiles/DHCPOverview.html.

* cited by examiner

INTEGRATED SERVICES HUB REBOOT PROCESS

CROSS-REFERENCE TO RELATED APPLICATIONS

This application is a continuation-in-part of U.S. Pat. No. 6,865,192, issued on Mar. 8, 2005 application Ser. No. 09/747,907 filed Dec. 22, 2000, hereby incorporated by reference in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

The present invention relates to a method for initialization of a customer premises telecommunications hub, and more particularly to a method of automatically downloading binary files through the Internet.

Traditionally, telephony communications within the United States were handled by the public switched telecommunications network (PSTN). The PSTN can be characterized as a network designed for voice communications, primarily on a circuit-switched basis, with full interconnection among individual networks. The PSTN network is largely analog at the local loop level, digital at the backbone level, and generally provisioned on a wireline, rather than a wireless, basis. The PSTN includes switches that route communications between end users. Circuit switches are the devices that establish connectivity between circuits through an internal switching matrix. Circuit switches set connections between circuits through the establishment of a talk path or transmission path. The connection and the associated bandwidth are provided temporarily, continuously, and exclusively for the duration of the session, or call. While developed to support voice communications, circuit switches can support any form of information transfer (e.g., data and video communications).

In a traditional PSTN environment, circuit switches include central office (CO) exchanges, tandem exchanges, access tandem exchanges, and international gateway facilities. Central offices, also known as exchanges, provide local access services to end users via local loop connections within a relatively small area of geography known as an exchange area. In other words, the CO provides the ability for a subscriber within that neighborhood to connect to another subscriber within that neighborhood. Central offices, also known as end offices, reside at the terminal ends of the network. In other words, COs are the first point of entry into the PSTN and the last point of exit. They are also known as class 5 offices, the lowest class in the switching hierarchy. A class 5 telephone switch communicates with an analog telephone using the analog telephony signals in the well-known analog format. The class 5 telephone switch provides power to the telephone; detects off-hook status of the telephone and provides a dial tone in response; detects dual-tone multi-frequency signals from the caller and initiates a call in the network; plays a ringback tone to the caller when the far-end telephone is ringing; plays a busy tone to the caller when the far-end telephone is busy; provides ring current to the telephone on incoming calls; and provides traditional telephone services such as call waiting, call forwarding, caller ID, etc.

In an effort to increase the amount and speed of information transmitted across networks, the telecommunications industry is shifting toward broadband packet networks which are designed to carry a variety of services such as voice, data, and video. For example, asynchronous transfer mode (ATM) networks have been developed to provide broadband transport and switching capability between local area networks (LANs) and wide area networks (WANs). The Sprint ION network is a broadband network that is capable of delivering a variety of services such as voice, data, and video to an end user at a residential or business location. The Sprint ION network has a wide area IP/ATM or ATM backbone that is connected to a plurality of local loops via multiplexors. Each local loop carries ATM over ADSL (asymmetric digital subscriber line) traffic to and from a plurality of integrated service hubs (ISHs), which may be at either residential or business locations.

An ISH is a hardware component that links business or residential user devices such as telephones and computers to the broadband, wide area network through a plurality of user interfaces and at least one network interface. A suitable ISH is described in U.S. Pat. No. 6,272,553 entitled "Multi-Services Communications Device," issued on Aug. 7, 2001, which is incorporated by reference herein in its entirety. The network interface typically is a broadband network interface such as ADSL, T1, or HDSL-2. Examples of user interfaces include telephone interfaces such as plain old telephone system (POTS) ports for connecting telephones, fax machines, modems, and the like to the ISH; computer interfaces such as Ethernet ports for connecting computers and local area networks to the ISH; and video ports such as RCA jacks for connecting video players, recorders, monitors, and the like to the ISH.

In providing telephony services over a broadband network, the ISH communicates with a service manager. This connection between the telephone and the network element is typically an ATM connection, which is much different than the traditional analog line to the local switch. ATM connections usually do not support analog telephony signals, such as off-hook, dial tone, and busy signals. Therefore, the ISH must provide many of the telephony functions traditionally provided by the telephone provider central office such as detecting off-hook conditions, on-hook connections, and digits as well as providing the telephones with dial tone, ring voltage (sometimes referred to as ring current), ringback, and busy signals. The terms off-hook and off-hook condition as used herein are generic terms meaning that a user device (whether telephone, facsimile machine, modem, etc.) connected to a telephone line is attempting to access and use the line.

The ISH includes a processing core or central processing unit, CPU, which controls these functions. It must exchange data with numerous peripheral devices within and external to the ISH itself. As with any CPU, it must have appropriate software, i.e. binary files, in order to perform the many required functions. As the controller for the ISH, it requires configuration files to deal with the various interfaces for the POTS ports, Ethernet ports, etc. However, the necessary configuration and binary files are not known until the ISH is installed in a customer premises, such as a private residence. The selection of appropriate files depends on the particular model of ISH which has been installed and the particular set of services which have been ordered by the customer. It is not practical to expect or require individual customers to know how to configure the ISH after it is physically installed. It would be quite expensive to have a trained service technician visit each residence for initializing the system, i.e. loading the necessary software. There is a need for a method for automatically initializing an ISH when it is installed and powered up for the first time.

BRIEF SUMMARY OF THE INVENTION

The present invention provides a method for operating an integrated services hub so that upon rebooting it automatically initializes itself by locating and downloading the necessary binary files. The ISH performs a multistep process. It first issues a DHCP request to a central office DHCP server. The DHCP server response includes the name of an appropriate configuration file, a domain name referring to a TFTP file server where the configuration file is stored and an IP address for a domain name server which can provide an IP address for a TFTP file server. The ISH sends a request to a domain name server for the IP address of a TFTP file server. The ISH then sends a request to a TFTP file server for the configuration file, downloads and parses the file from which it learns the name of a binary code file. It replaces the model ID part of the binary file name with an ID identifying the ISH model and, if necessary, adds a suffix identifying the file name as a binary file. If a file with the resulting name is not already found in an ISH memory, it then requests, receives and downloads the binary code into flash memory and reboots the system. When the process has been successfully completed, the ISH is properly configured and goes into the run state.

In one embodiment, the DHCP provides IP addresses for multiple domain name servers. The ISH cycles through the list of domain name servers if its requests to the domain name server are not answered promptly. The TFTP domain name has multiple servers associated with it and the domain name server provides IP addresses for the multiple servers. The ISH will cycle through its list of TFTP IP addresses if its requests are not answered promptly.

DETAILED DESCRIPTION OF THE INVENTION

Figure 1:
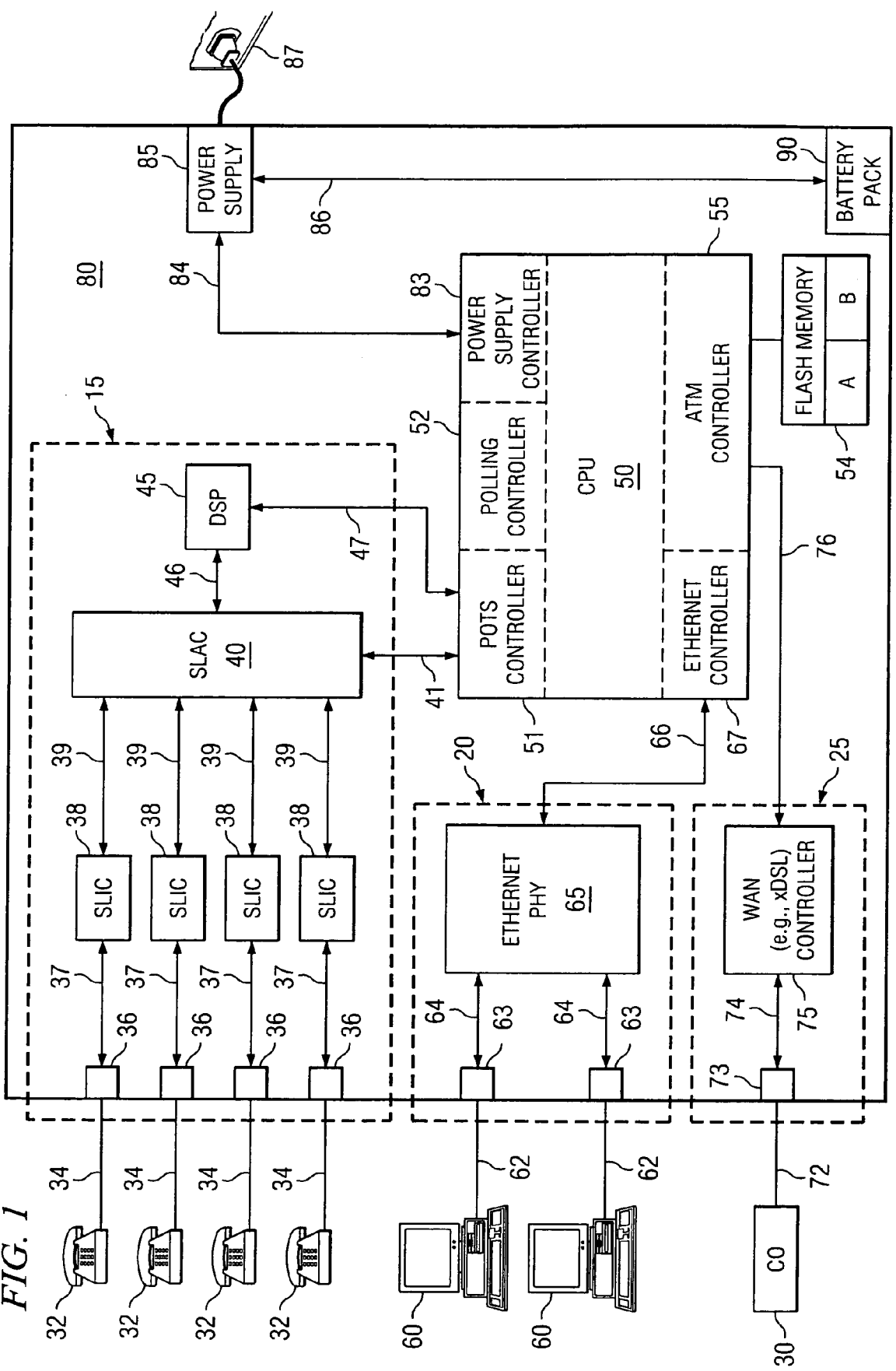
FIG. 1 is a block diagram of an integrated services hub, ISH, according to the present invention.

Referring to FIG. 1, integrated services hub (ISH) 10 comprises plain old telephone system (POTS) interface 15, local area network (LAN) interface 20, and wide area network (WAN) interface 25. POTS interface 15 and LAN interface 20 provide user interfaces for the ISH. WAN interface 25 provides the ISH with an interface to a central office, CO, 30 having a broadband packet network such as Sprint's ION network. The CO 30 provides the wide area connection to the Wide Area Network (WAN), i.e. the Internet. In describing the ISH, the components are generally described in carrying out the appropriate function to transmit data from the user interfaces to the WAN, and it should be understood that these components in general perform the reverse function when receiving data from the WAN and transmitting it to the user interfaces.

Telephones 32 are connected by telephone lines 34 to POTS interface 15 by telephone jacks 36, for example industry standard RJ-11 jacks. While four telephones are shown in FIG. 1, any desirable number of telephones may be employed provided that the equipment is appropriately sized to accommodate that number. Telephones 32 are conventional communications devices that typically use the analog telephony format, and similar devices may be substituted such as facsimile machines or modems. Digital format telephones could also be used, with the understanding that the specific circuitry involved would change while providing equivalent functions (for example, detecting hook transitions). Telephone lines 34 are any medium operational to carry telephony signals, and are typically twisted pairs of copper wires.

In addition to telephone jacks 36, POTS interface 15 further comprises subscriber line interface circuits (SLICs) 38, subscriber line access circuit (SLAC) 40, and digital signal processor (DSP) 45. SLICs 38 are connected to telephone jacks 36 by connections 37 on a one-to-one basis. In other words, each telephone connected to the ISH by a telephone jack has a separate and corresponding SLIC. Alternatively, SLICs may incorporate more than one channel each, that is to say a SLIC may be connected to more than one telephone line. The SLICs convert relatively high power, two-line analog signals (also referred to as a tip and ring phone circuit) received from the telephone into relatively low power, four-line analog signals (also referred to as a transmit signal circuit and a receive signal circuit). Furthermore, the SLIC serves as the amplifier that drives power (i.e., voltage and current) onto its corresponding telephone line. Examples of suitable SLICs are integrated circuit chip numbers AM79R79 and AM79R241 produced by Legerity, the former communications division of Advanced Micro Devices (AMD), Inc.

SLAC 40 is connected to SLICs 38 by connections 39. Generally, a SLAC performs three functions: line supervision, signal filtering and manipulation, and analog/digital conversions. The SLAC supervises the lines (and the SLIC corresponding to each line), which includes execution of various protocols for detecting and recognizing an off-hook condition. While a preferred embodiment shown in FIG. 1 uses a SLAC to perform line supervision, SLICs are available that perform line supervision functions, and such enhanced SLICs having integral hook transition monitoring capability could be used. Signal filtering and manipulation is used to conform signals to various industrial or regional/national telephony standards. The SLAC converts four-line analog signals received from the SLICs into four-line digital signals. Thus, the SLAC is an analog to digital (A/D) and digital to analog (D/A) converter, which is also referred to respectively as coding and decoding (i.e., a CODEC). Preferably, the SLAC codes and decodes in compliance with the International Telecommunications Union (ITU) G.711 standard. Typically, a SLAC manages a fixed number of SLICs, and thus the number of SLACs is determined by the number of SLICs. Examples of suitable SLACs are integrated circuit chip numbers AM79Q021 and AM79Q2243 produced by Advanced Micro Devices (AMD), Inc., which are a quad-devices designed to manage four SLICs.

SLAC 40 transmits and receives control data such as line status and signaling to the central processing unit (CPU) 50 by connection 41. The CPU 50 controls the overall function of the ISH and has initialization, management, configuration, and control responsibilities for all of the components and interfaces comprising the ISH. Control software, i.e. the binary code, is stored in flash memory 54. Upon start up or reboot of the ISH, the CPU 50 loads the control software into RAM from which it is executed by the CPU 50. Upon execution of the control software, the CPU 50 interacts with various memory mapped peripherals (for example, WAN interface 25). The CPU 50 control software includes a) a POTS control module 51 that controls the telephony functions during operation of the ISH under primary power; b) a polling control module 52 that controls the POTS telephony functions when primary power fails; c) a power supply control module 83 which monitors, either continuously or periodically, the power supply; and d) ATM control module 55 that controls the communications with the network. An example of a suitable CPU is integrated circuit chip number MPC8260 Power QUICC II Communications Processor produced by Motorola, Inc.

Digital signal processor (DSP) 45 compresses (i.e., packetizes) data, typically voice data, received from SLAC 40 by connection 46. DSP 45 transmits compressed data to CPU 50 via connection 47 for transmission to CO 30 by ATM control module 55. An example of a suitable DSP is integrated circuit chip number TMS320VC5402 produced by Texas Instruments, Inc. ATM control module 55 provides the ATM and AAL (ATM adaptation layer) layers of the ATM Protocol, which are necessary for ATM-formatted communications with CO 30. In a preferred embodiment, ATM control module 55 is a software module on CPU 50.

Computers 60, for example personal computers located on a residential premises, are connected by connections 62 to LAN interface 20 by LAN connectors 63. LAN connectors 63 are preferably RJ-45 jacks, but any suitable computer connection means may be employed, for example a universal serial bus (USB). While two computers are shown in FIG. 1, any desired number of computers may be employed provided that the equipment is appropriately sized to accommodate that number.

LAN interface 20 further comprises a LAN physical layer (PHY) device 65 connected to LAN connectors 63 by connections 64. LAN PHY device 65 is preferably an Ethernet PHY, and more specifically a MII transceiver. CPU 50 contains an Ethernet control module 67, which serves as a media access control (MAC) device and is connected to LAN PHY device 65 by connection 66. The Ethernet PHY and MAC devices support a 10/100 Mbit industry standard MII Ethernet connection.

The CO 30 is connected by connection 72 to WAN interface 25 by WAN connector 73. WAN connector 73 is preferably a RJ-11 jack for ADSL. WAN interface 25 is preferably a universal, xDSL interface, and more preferably an ATM over ADSL interface. xDSL is a generic term encompassing all known varieties of digital subscriber lines (DSL) such as ADSL, U-ADSL, SDSL, HDSL2, RADSL, etc. Other types of WAN interfaces could be used such as T1, cable modem, wireless broadband modem, or ATM-25.

WAN interface 25 further comprises WAN controller 75 connected to WAN connector 73 by connection 74. WAN controller 75 is connected to ATM control module 55 by connection 76. WAN controller 75 is preferably Globespan's G7000 multimode chip set, which further comprises an analog front end (AFE) chip (Globespan GS707X) and a multimode xDSL downloadable DSP and framer chip (Globespan GS707X). The AFE chip provides analog to digital and digital to analog signal conversions. The DSP and framer chip provides digital signal processing and signal transmission framing functions.

POTS interface 15, LAN interface 20, WAN interface 25, CPU 50, and ATM controller 55 are mounted on motherboard 80, which is a printed circuit board (also referred to as a logic board) that provides the various connections between ISH components as discussed above. The motherboard may include expansion slots to accept expansion cards such as an additional POTS card, an ATM-25 interface, a cable modem, etc. Motherboard 80 is connected to power supply 85 and battery pack 90, thereby providing power to the ISH components, the attached analog telephones, and the battery monitoring and charge circuitry. CPU 50 contains a power supply control module 83 connected to power supply 85 by connection 84. A preferred power supply is a universal-input (40–400 Hz, 90–270V AC RMS) switch mode lead/acid battery float charger with a current-limited output of nominally 13.8 V, and provides charging current to battery pack 90 as represented by connection 86. A preferred battery is a 12 volt DC, 2.5 A gel cell (lead-acid) battery, and preferably battery pack 90 comprises two such batteries housed within the ISH.

The power supply is plugged into a standard electrical outlet 87 and serves as the primary power source for the ISH. In the event of a power failure to the electrical outlet, the ISH operates under backup power provided by its battery pack 90 and basic telephone services remain available to the customer for emergency calls.

The controllers illustrated as being part of the CPU 50 are actually software stored as configuration files in RAM and as binary code in flash memory 54. Flash memory 54 includes two partitions, labeled A and B in FIG. 1 and also referred to as Flash A and Flash B, which are reserved for the binary code. At the time of manufacture of the ISH, its final installation location and configuration are not known and therefore the required configuration files and binary code cannot be known. Instead, the ISH is manufactured with a basic binary code stored in Flash A 54 to perform an automatic downloading of configuration files and binary code according to the steps illustrated in FIG. 2. Upon initial startup of the system, that original binary code is read from Flash A 54 into RAM for operation of CPU 50.

Figure 2:
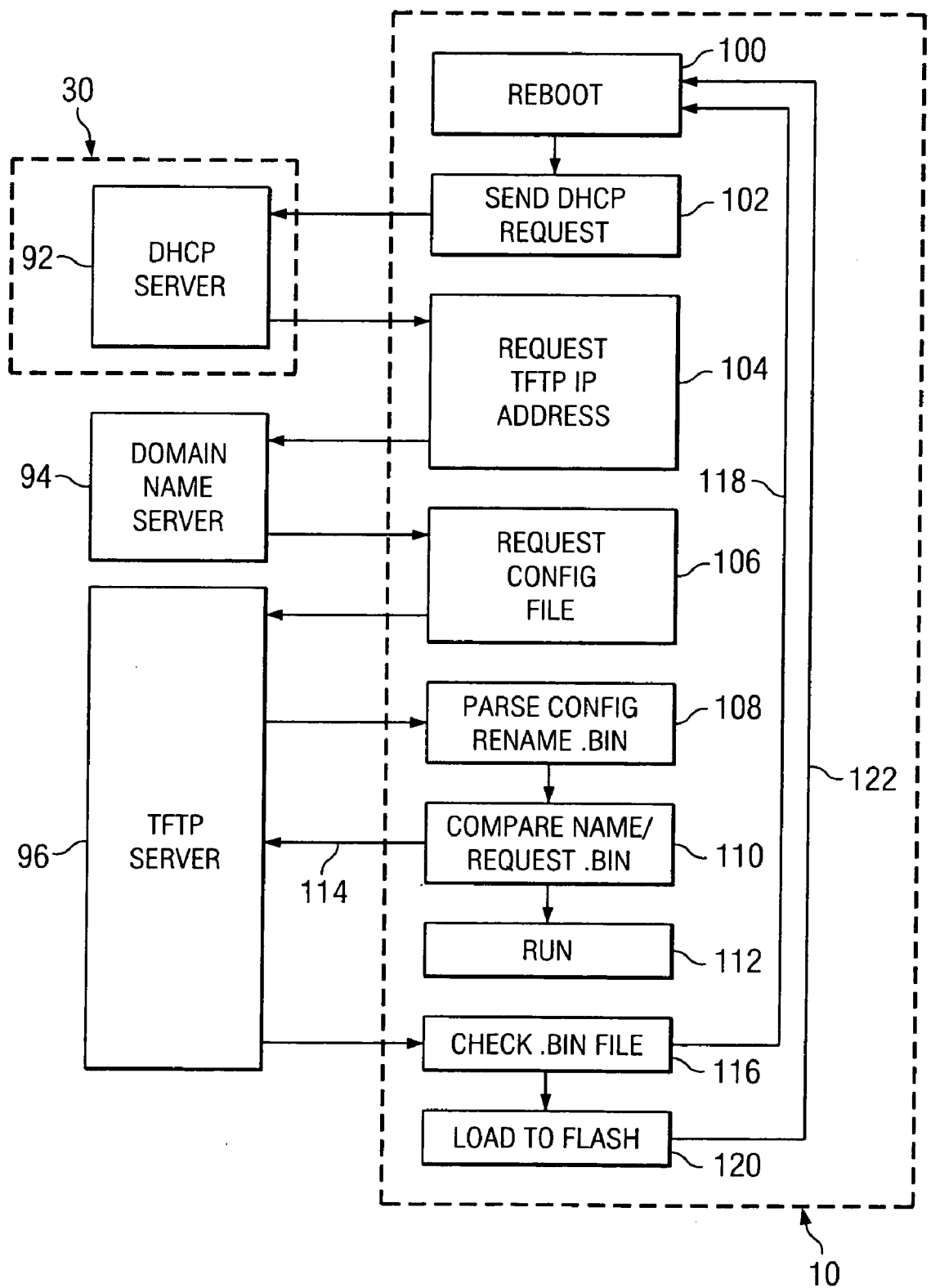
FIG. 2 is a flow diagram illustrating an embodiment of an automatic rebooting process according to the present invention.

In FIG. 2, the dotted line box 10 represents the ISH 10 of FIG. 1, and more particularly the reboot steps which occur in ISH 10. The rebooting process also involves three servers which are external to the ISH and do not need to be located on the same premises as the ISH. One is a DHCP (Dynamic Host Configuration Protocol) server 92, which may be located in CO 30 (FIG. 1). Another is a domain name server, DNS, 94, which may be located essentially anywhere, so long as it is accessible over a network, preferably the Internet. The third is a TFTP (Trivial File Transfer Protocol) server 96 which may also be located essentially anywhere, so long as it is accessible over a network, preferably the Internet.

The process described with reference to FIG. 2 occurs on any rebooting event, which term is used herein to include the initial boot up of the system on its original installation and first connection to power source 87. Rebooting of the system also occurs when power has been turned off, e.g. when power at outlet 87 is lost for sufficient time to deplete the backup power supply battery pack 90, and then power is restored. Rebooting also can occur when a manual reset button is pressed or when a reset command is sent over the Internet, e.g. to upgrade the system software to a new release. An alternate manual reset process is to intentionally disconnect the ISH from it power sources and to then reconnect power. As will be described in more detail below, a reboot also occurs as part of the reboot process whenever the process includes successful downloading of a new binary file or when an attempted download fails. In FIG. 2, the box 100 represents the initiation of all reboot events.

In step 102, the ISH 10 broadcasts a DHCP request to the DHCP server 92 in CO 30. The request includes the MAC ID of the ISH. This request is sent through WAN 25 and over the xDSL lines connecting the ISH 10 to the CO 30. In response to this request, the DHCP server 92 sends back to the ISH 10 an acknowledgment (ACK), a unique IP address to identify the ISH 10, an IP Address of a domain name server (DNS), a TFTP domain name (in this case, the name of TFTP server 96) and a configuration file name, which may be the same as the MAC ID of the ISH. In a preferred embodiment, the response includes IP addresses of multiple DNSs, all of which can provide TFTP server IP addresses. Since the ISH now has its own IP address, it can send data packets to and receive data packets from any other site on the Internet.

In step 104, the ISH uses a DNS IP address which it received from DHCP server 92 to send a request to domain name server 94 to obtain the IP address of the TFTP server 96. In a preferred embodiment where ISH 10 has received multiple DNS IP addresses, the ISH will automatically cycle through the addresses if it does not receive a TFTP IP address within a preselected timeout period or after a preselected number of retries. The DNS server 94 responds by sending to ISH 10 an IP address for the TFTP server 96. In a preferred embodiment, the response from DNS server 94 will include IP addresses for multiple servers associated with the TFTP domain name.

In step 106, the ISH uses a TFTP server IP address which it received from DNS 94 to send a request to TFTP server 96 for the configuration file which was identified by DHCP server 92. In a preferred embodiment where ISH has received multiple TFTP server IP addresses, the ISH will automatically cycle through the addresses if it does not receive a configuration file after a preselected number of retries or within a preselected timeout period. The TFTP server 96 responds by sending the requested configuration file to ISH 10.

In step 108 the ISH 10 receives the configuration file from TFTP server 96 and parses the configuration file. The configuration file contains the name of a binary file. Binary file names consist of three parts. One part, usually a prefix, is a model ID which identifies the model, e.g. C100, of the ISH for which the file is intended. The end of the prefix is identified by the underscore symbol, i.e. "_". The second part is version name which has as the first letter a numeric digit, e.g. 1.23.45.67 or 5version2.0. This second part primarily identifies the release number of the binary files, but each release has different versions intended for different ISH models. The last part of the file name is a suffix identifying the file type, in this case ".bin" identifying the file as a binary file. Thus a complete binary file name may have the form C100_1.23.45.67.bin. It is important that the binary file be the appropriate one for the model of the ISH which downloads the file. To avoid downloading errors, the ISH renames the binary file. It replaces the model ID part of the binary file name with its own model ID. Thus with reference to the example file name above, if the ISH is a model C50, it deletes the prefix "C100" and replaces it with the prefix "C50". The ISH also checks to be sure that the suffix ".bin" is present at the end of the file name, and, if not, it adds the suffix.

At step 110, after renaming the binary file, the ISH compares the binary file name to the binary file which is stored in the active partition of flash memory 54, either Flash A or Flash B. If the names match, the hub goes into the run state as indicated at 112. In some cases, a reboot may be required at this point because of changes which occurred in the configuration file, even though the correct binary file is in the active flash memory partition.

At step 110, there are several possible reasons why the binary file name may not match the binary file stored in the active flash memory 54 partition. For example, at the time of manufacture, a basic binary file is loaded into Flash A and Flash A is designated the active partition. The basic binary file is not suitable for running the telephony functions of the ISH. It is suited for running the initial reboot process described herein. As a result, on initial start up, the file names will not match. At other times, the file names may not match because the purpose of a reboot was to upgrade to a new release of binary code.

In step 110, if the binary file names do not match, the ISH sends a request, indicated by arrow 114, to the TFTP server 96 for the binary file. The binary file name requested is the name which was generated by the ISH in the renaming process in step 108. As noted above, the ISH 10 has a list of TFTP IP addresses and will retry and cycle through the list if its requests are not answered promptly. It is not necessary to obtain the configuration file and the binary file from the same TFTP server. Multiple servers are normally available for redundancy and quality of service purposes. The TFTP server 96 responds by sending the requested binary file to ISH 10.

At step 116, the ISH 10 receives the requested binary file from TFTP server 96. The file is temporarily stored in its compressed form in SDRAM in processor 50 until certain checks are made. The model ID in the file name is checked to be sure the model ID is correct. This is a double check in conjunction with the renaming process of step 108. If the model ID is correct, the ISH performs a CRC, cyclical redundancy check.

If the file fails to pass either the model check or the CRC check, the ISH goes into error state and, as indicated by arrow 118, goes back to the reboot step 100. The process described herein will then be repeated until a good binary file has been received.

If the file passes both the model and CRC checks, the compressed binary file is moved into the inactive partition of flash memory 54 at step 120. On initial startup, Flash A will be active, and the new file will be moved into Flash B. Once the transfer is completed successfully, the ISH performs a "lock image" on that partition, in this case Flash B. At that point, Flash B becomes the active partition and Flash A becomes the inactive partition of flash memory 54.

When step 120 has been completed, the ISH will send a reboot signal as indicated by arrow 122. This is needed because, at that point in the process, the binary file which is operating the processor 50 is still the file which was stored in the active partition of flash memory 54, e.g. Flash A, when the process started. Upon reboot, the new binary file, e.g. in Flash B, will be loaded into RAM and the system will operate with the new binary file. When the ISH gets to step 110, it should find that the designated binary file name matches the file in the active flash memory 54 partition, e.g. Flash B, and the system will move into the run state 112.

In the above description, an initial startup sequence has been described. In that sequence, the factory loaded binary file was in Flash A and Flash A was the designated active partition. After successful startup, a new binary file was stored in Flash B and Flash B was designated the active partition. When a new binary file, e.g. a new release, is to be downloaded into the ISH, it will be written over Flash A and Flash A will become the active partition again. Successive updates will be written into the then inactive partition, which will become the active partition when the file has been successfully saved to flash memory 54. This process avoids loss of all valid binary files in the event of power loss or other interruption during the process of writing a new binary file to flash memory. That is, any unsuccessful reboot attempt can be started over with the same binary file as it started with.

The above description assumes that each step of the process works as intended on the first try. The ISH may desirably provide some additional steps when the process does not work smoothly. One is an overall timeout for the startup process. If the ISH does not reach the run state 112 within the set time, the ISH will reset and start the process over. The ISH may retry a given DNS 94 or TFTP server 96 a limited number of times before the system tries another domain name server or TFTP server. If the parsing operation in step 108 fails, the system may also reset and start the process over.

While the present invention has been illustrated and described with reference to particular equipment and methods of operation, it is apparent that various changes and substitution of equivalent parts can be made within the scope of the present invention as defined by the appended claims.

I claim:

1. A method for initializing a customer premises telecommunications hub having a link to a central office comprising:
   obtaining a configuration file name and a domain name of a TFTP file server from a DHCP server in a central office,
   obtaining a configuration file, including a first control software file name, from the TFTP file server,
   creating a second control software file name by combining a model ID identifying the model of the hub with at least part of the first control software file name, and
   obtaining a control software file having the second control software file name from the TFTP file server.

2. A method according to claim 1, wherein:
   said first control software file name includes a prefix identifying a model number, and said step of creating a second control software file name comprises replacing the prefix of said first control software file name with a prefix comprising the model number of said hub.

3. A method according to claims 1, further comprising:
   comparing the name of said control software file to said second control software file name.

4. A method according to claim 3, further comprising:
   loading said control software file into a first flash memory partition in said hub and designating said first partition as the active partition.

5. A method according to claim 4 further comprising:
   rebooting said hub with said control software file in said first flash memory partition.

6. A method according to claim 5 wherein:
   said control software file is stored in compressed form in said first flash memory partition, and on rebooting, said file is expanded and loaded into RAM for operating said hub.

7. A method according to claim 1, further comprising:
   checking said first control software file name for the presence of a suffix identifying it as a binary file name, and, if such suffix is not present, adding a suffix identifying said first control software file name as a binary file name.

8. A method according to claim 1, further comprising:
   obtaining an IP address of a domain name server from said DHCP server in said central office, and
   obtaining an IP address of said TFTP server from said domain name server.

9. A method for providing control software code to a customer premises telecommunications hub having a link to a central office comprising:
   upon rebooting of the hub, sending a DHCP request to a central office DHCP server;
   sending a configuration file name and a domain name of a TFTP server from the central office DHCP server to the hub;
   sending a request for the configuration file from the hub to the TFTP server,
       sending the configuration file, including a first control software file name, from the TFTP server to the hub,
       creating a second control software file name by combining a model ID identifying the model of the hub with at least part of the first control software file name,
       sending a request for the control software file having said second control software file name from the hub to a configuration file server, and
       sending the control software file having said second control software file name from the configuration file server to the hub.

10. The method of claim 9 wherein:
    said first control software file name includes a prefix identifying a model number, and said step of creating a second control software file name comprises replacing the prefix of said first control software file name with a prefix comprising the model number of said hub.

11. The method of claim 9 further comprising:
    comparing the name of said control software file to said second control software file name.

12. The method according to claim 11, further comprising:
    loading said control software file into a first flash memory partition in said hub and designating said first partition as the active partition.

13. The method according to claim 12, further comprising:
    rebooting said hub with said control software file in said first flash memory partition.

14. The method according to claim 13 wherein:
    said control software file is stored in compressed form in said first flash memory partition, and on rebooting, said file is expanded and loaded into RAM for operating said hub.

15. The method according to claim 14, further comprising:
    checking said first control software file name for the presence of a suffix identifying it as a binary file name, and, if such suffix is not present, adding a suffix identifying said first control software file name as a binary file name.

16. The method according to claim 9, further comprising:
    obtaining an IP address of a domain name server from said DHCP server in said central office, and
    obtaining an IP address of said TFTP server from said domain name server.

* * * * *